April 11, 1950 A. A. BARCO 2,503,700

PHASE DETECTOR

Filed Sept. 30, 1947

INVENTOR
Allen A. Barco
BY Samuel B. Smith
ATTORNEY

Patented Apr. 11, 1950 2,503,700

UNITED STATES PATENT OFFICE 2,503,700

PHASE DETECTOR

Allen A. Barco, Jackson Heights, N. Y., assignor to Radio Corporation of America, a corporation of Delaware Application September 30, 1947, Serial No. 776,986

11 Claims. (Cl. 250—36)

Figure 1:
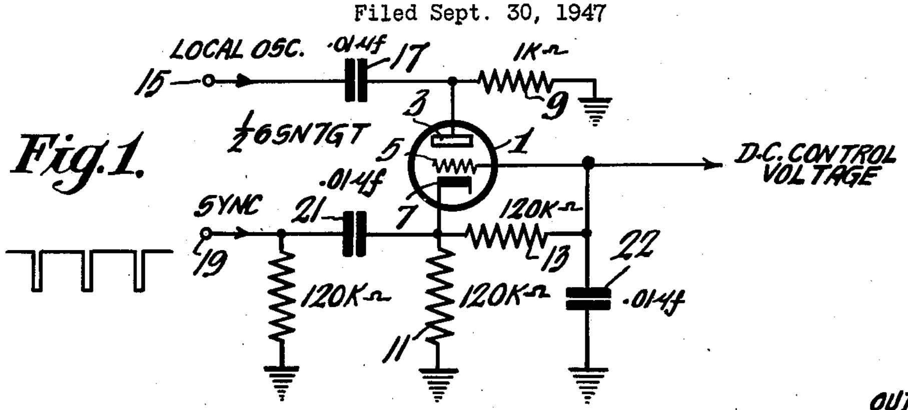

This invention relates to phase detection and more particularly to circuit arrangements for synchronization of signal oscillation generators.

The advancement of the electronic art has established many requirements for accurate frequency control of signal generators.

Numerous signal generators have been developed, making it possible to generate almost any wave shape. In many cases, however, it is important that the wave shape must recur in synchronism with a standard synchronizing signal or standard synchronizing pulses.

Although this invention is applicable to any signal generator producing wave shapes recurring at a synchronous frequency, for the purpose of explanation of its operation the description of the invention will be limited to the sine wave generator and the sawtooth wave generator.

Oscillators employing thermionic discharge devices tend generally to synchronize themselves with injected synchronizing pulses or signals of approximately the same frequency. This phenomenon is the result of third-order curvature tube characteristics. Generally the amount by which the oscillator frequency will vary increases with the amplitude of the injected voltage, and varies inversely as the stability of the oscillator. When the frequencies of the oscillator circuit and the injected synchronizing signal are approximately in simple harmonic relation, synchronism will tend to occur at the corresponding ratios of integers. This tendency is less pronounced when both frequencies are the same. In cases where the injected voltage is almost, but not quite, large enough to produce synchronization, the frequency of the oscillator circuit is shifted or, in general, made to approach the frequency of the synchronizing signal.

In many requirements, however, an "approach" to synchronization is not sufficient, but the oscillator circuit must be driven not only in exact synchronism, but in accurate phase relation with the synchronizing signal.

Generally speaking, if the generator oscillation and the synchronizing signal are applied in combination to a phase detector circuit and the rectified output energy is employed to actuate a device that operates to change the fundamental frequency of the oscillator, an accurate control may be obtained. If, for example, synchronism is assumed, the vector sum of the two voltages of the oscillator circuit and the synchronizing signal depends on their relative phase. Therefore, if the oscillator frequency should for some reason tend to be greater than the corresponding synchronizing signal, the resulting advance in phase of the oscillator current with respect to the synchronizing current changes the vector sum and hence the reactance of the circuit, thereby decreasing the oscillator frequency and so restore synchronism.

One important application of automatic frequency and phase control arrangement is the synchronization in television systems of the scanning operations with a predetermined synchronizing signal plus frequency. An important problem in the reception of television images is the provision of satisfactory synchronism, particularly in the presence of extraneous noise.

A system of synchronism which has given generally satisfactory results has depended for its operation on the reception and separation of individual synchronizing pulses. The separated pulses are then employed to drive directly the wave generator. It may be said of this system that satisfactory synchronization can be obtained, providing the synchronizing signals are not accompanied by extraneous noise. However, for operation where field strength of the television signal may be low, an improvement in synchronization will produce an improved television image.

K. R. Wendt and G. L. Fredendall showed and described an automatic frequency and phase control system for television receivers in an article entitled "Automatic frequency and phase control of synchronization in television receivers" published in the "Proceedings of the Institute of Radio Engineers" for January 1943. In the paper referred to, an automatic frequency and phase control of the sawtooth scanning voltages depended on the average of many regularly recuring synchronizing pulses. In such a system, it will be seen that noise would have insufficient effective energy at the scanning frequencies to effect control through the direct-current link from which all but relatively long-time variations are filtered out.

In the article referred to above, an automatic frequency control circuit is employed wherein the synchronizing pulses are supplied to a phase detector by means of a balanced circuit. A fraction of the output of the scanning oscillator is also introduced to the balanced circuit in order to form a composite signal whose amplitude is proportional to the phase displacement of the signal generated by the scanning oscillator with the synchronizing pulses.

The commercial production of television equipment and the like dictates careful consideration to be given to the number of tubes employed in accomplishing certain results. It is therefore extremely important that a minimum of tubes, together with circuit components, be employed in the construction of any manufactured device. If, therefore, a result may be obtained by the employment of a single tube where heretofore a plurality of tubes was required, it is generally an important contribution to the art. This is particularly true if the new arrangement employs not only less tubes, but tubes which are less complicated to manufacture.

Heretofore, the phase detector employed to supply the D.-C. control voltage for automatic frequency and phase control of the scanning sweep oscillator in television receivers has been of the balanced detector type. This type, although the circuit performs satisfactorily, required the employment of two diodes having separate cathodes. Because of the balanced nature of the detector heretofore employed, it has been necessary to supply one of the signals, if the two signals are to be compared, in two phases 180° apart, balanced to ground, that is, the two phases must be applied in push-pull.

According to one form of the present invention, a single triode 1 is used which may, for example, if convenient, be one-half of a double triode.

The employment of a single triode or one-half of a double triode is more economical than a double diode having separate cathodes, furthermore, each of the signals between which phase differences are to be detected need be supplied in only a single phase. This affords additional economies in the construction of driving circuits.

According to this invention, a simplified automatic frequency and phase control system is provided for the synchronization of a signal generator. A D.-C. control voltage is obtained from the control electrode of a triode upon whose anode has been impressed energy from the local generator and upon whose cathode is impressed a sync signal.

A primary object of this invention is to provide an improved automatic frequency and phase control system.

Another object of this invention is to provide for improved synchronism of recurring wave shape generators.

Still another object of this invention is to simplify automatic frequency and phase control systems.

Still another object of this invention is to provide for more economical frequency and phase control of synchronization in television receivers.

Figure 2:
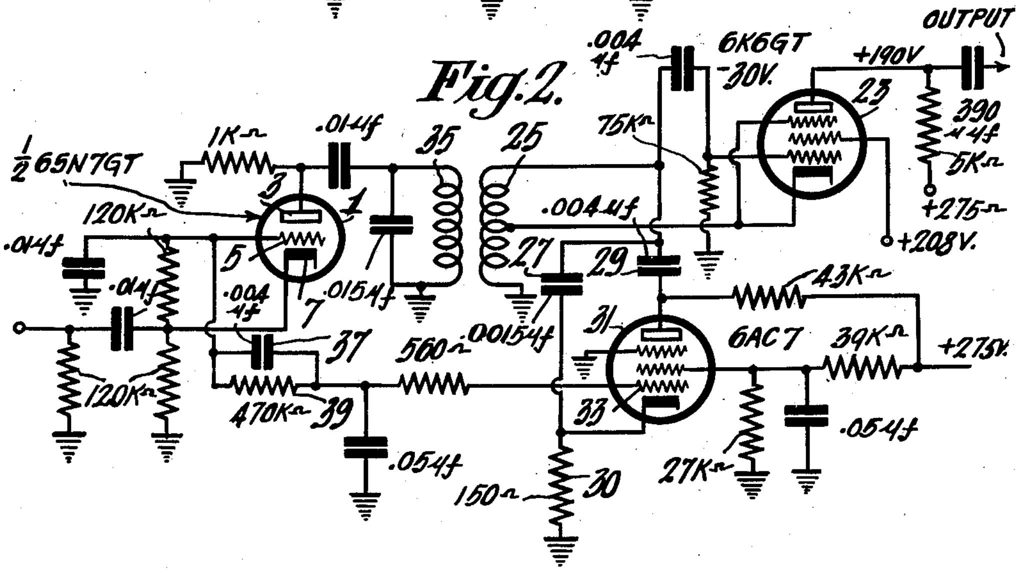
Figure 3:
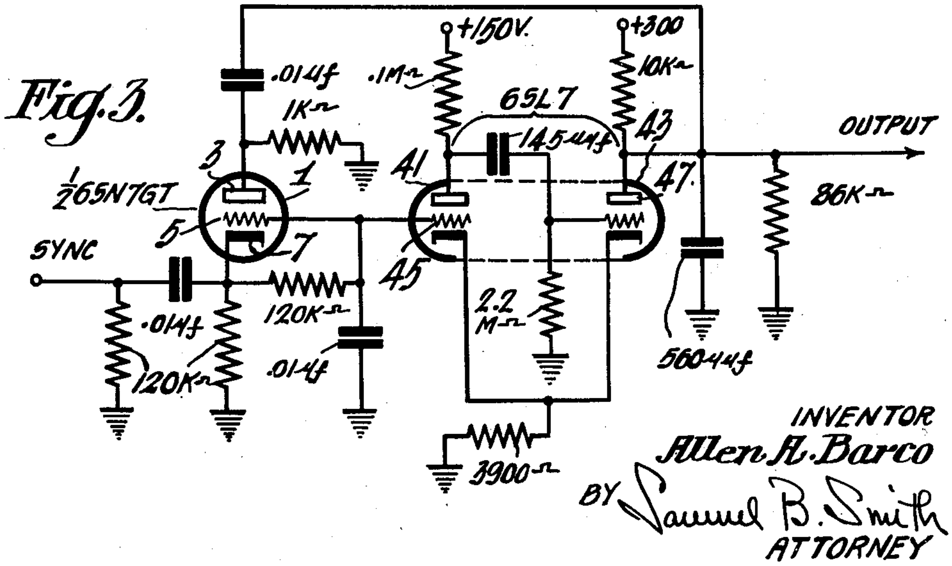

Other and incidental objects of this invention will be apparent to those skilled in the art from a reading of the following specification and an inspection of the accompanying drawing in which Figure 1 shows by circuit diagram one form of this invention;

Figure 2 illustrates also by circuit diagram one form of this invention as applied to the synchronism of a typical sine wave signal generator; and Figure 3 illustrates by circuit diagram the employment of this invention to control a sawtooth wave generator.

Referring in more detail to Figure 1, there is shown a tube 1 having an anode 3, an electrode 5 and a cathode 7. Electrode 5 may, for example, be the control electrode of a triode as illustrated, but may take the form of any electrode positioned between cathode 7 and anode 3.

Anode 3 is connected to ground through a resistive element 9. It may be desirable when employing some tube types to apply a small D.-C. voltage to anode 3 for purposes of equalizing anode and grid currents so as to facilitate achieving initial balance. Cathode 7 of tube 1 is connected to ground through a resistor 11. A resistive element 13 is connected between the control electrode 5 and the cathode 7.

A terminal 15 is provided to supply a local oscillator signal to anode 3 through condenser 17. A synchronizing signal terminal 19 is provided to supply cathode 7 with a synchronizing signal through capacity 21. A capacitive element 22 connects the intermediate or control electrode 5 to ground.

By employment of the circuit illustrated in Figure 1, a D.-C. control voltage is obtained at the control electrode 5, which is amplitude and polarity dependent upon the relative phases between the local oscillator signal applied to terminal 15 and the synchronizing signal applied to terminal 19.

Balance is unaffected by amplitude variations in either the local oscillator signal or the synchronizing signal.

The triode 1 in effect acts as a pair of diodes, one having a negative reaction on the other.

Tube types and values of resistors and condensers are given by way of example for illustration only, and it is not intended that this invention should be limited thereby.

The operation of the device illustrated in Figure 1 may best be understood by reference first of all to some features of this system. The system employs the low voltage positive grid characteristic of a triode as affected by plate potential. Circuit arrangements are employed and resistances are chosen so as to make the output circuit balance unaffected by large amplitude variations in either the local oscillator signal or the synchronizing signal.

Let it be assumed, for the purpose of explanation, that the local oscillator signal is in synchronism with the synchronizing signal.

In the absence of signal on anode 3 or at the instant when the potential of the anode 3 swings through zero and the cathode 7 is pulsed negatively, the grid 5 and cathode 7 act as a diode and produce a D.-C. potential across resistor 13 with a polarity as indicated by plus and minus on the drawing, leaving a negative potential on the grid 5 with respect to the cathode 7. Simultaneously, the anode 3 and the cathode 7 act as a diode to produce another potential across resistance 11 wherein the cathode is positive with respect to ground. This effect is similar to the action of two separate diodes, each connected as a peak detector. Since the developed D.-C. potentials are of equal and opposite polarity, providing proper circuit constants are chosen, the D.-C. control voltage obtained from the control electrode 5 is zero. The voltage obtained from the control electrode 5 remains at zero under these conditions regardless of the amplitude of the sync pulse. In view of the fact that under these conditions the A.-C. component of the anode voltage swings through zero, changes in the magnitude of the A.-C. voltage of the anode can have negligible effect on the anode curve.

If, for example, the phase of the sine wave or sawtooth wave provided at terminal 15 is shifted so that the pulses obtained at terminal 19 occur when the anode section is more positive, the potential across resistance 11 increases. In addition, because of the anode 3 being more positive than the control electrode 5, it robs space current from the control electrode 5 and causes the potential across resistance 13 to decrease. This results in a positive voltage on the control electrode, as compared to ground.

An opposite effect occurs when the synchronizing pulse appears while the signal applied to the anode is in its negative swing. Therefore, the D.-C. control voltage obtained from control electrode 5 swings positive or negative about zero, depending on the phase relationship between the local oscillator signal applied to terminal 15 and the synchronizing signal applied to terminal 19.

There are various systems for utilizing the D.-C. control voltage obtained from the circuit illustrated in Figure 1. Perhaps the simplest automatic frequency control circuit may consist of a circuit employing the plate resistance of a tube connected in series with a reactive element and the combination connected across an oscillatory circuit. The reactive element is preferably a condenser, but it may alternatively be an inductance which further might take the form of the leakage inductance of a coil loosely coupled to the oscillatory circuit.

When the plate resistance of the tube is made numerically equal to the reactance of the condenser and varied by small increments, the effective shunt reactance across the oscilatory circuit varies to change the natural frequency of the oscillator circuit.

Although such a circuit will function, it has various limitations, such that it cannot be applied successfully to an oscillator circuit that is to be tuned over a wide band of frequencies. Furthermore, at low frequencies, inconsiderable frequency variation is obtainable, and at high frequencies, the output capacity of the tube acts to dilute the variations of the plate resistance.

A circuit which is better adapted to automatic frequency control and employing a different principle of operation is shown and described in Figure 2.

Turning now to Figure 2, there is shown one form of this invention employed to control the frequency of a typical sine wave generator. The sine wave generator illustrated in Figure 2 takes for purposes of example the form employed to control horizontal deflection of the scanning ray beam in a television receiver presently marketed as the model 630TS and shown and described in the "RCA Review" for March 1947.

An oscillator tube 23 is provided with a tuned circuit involving an inductance coil 25 and capacitive elements 27 and 29. The output signal is taken from the tube 23 to be employed for the generation of sawtooth waves, in accordance with the well-known and standard procedure.

There is connected in series with condenser 29 of the oscillating circuit, tube 31, which is adapted to control the natural frequency of the oscillatory circuit involving inductance 25 and condensers 27 and 29 by a change in its reactance.

Condenser 27 is connected in series with the cathode resistor 30 of tube 31 to present a reactive load to the oscillatory circuit, the amount of reactive load depending upon the control electrode potential of tube 31. The change in reactance of tube 31 is controllable by a change in potential of its control electrode 33. This may be accomplished by a connection to the control eletrode 5 of tube 1 which operates to provide a control potential at its control electrode 5, whose polarity and magnitude are dependent upon the difference in phase between the synchronizing signal applied to cathode 7 of tube 1 and the frequency of the sine wave generated in the oscillatory circuit including inductance 25 and capacities 29 and 27. The anode 3 of tube 1 obtains a portion of the sine wave through the coupling coil 35.

Condenser 37 and resistor 39 may be employed to provide desired filtering action of the control voltage.

Circuit arrangements provided in accordance with the teachings of this invention may be employed not only for the control of sine wave generators, but may be employed where there is a requirement for phase detection of any sort, such as, for example, the proper phasing of a sawtooth wave generator. Such employment is illustrated by the circuit diagram shown in Figure 3. Like numbers again represent like elements.

The sawtooth wave generator illustrated in Figure 3 employs, for example, two triode sections 41 and 43 of a dual triode type tube, such as the popular 6SL7 tube type.

The circuit arrangement shown is popularly known as the cathode coupled sawtooth wave generator and needs no detailed explanation of its operation here, except perhaps to indicate that the control voltage obtained from control electrode 5 of tube 1 in a manner explained above is applied to the control electrode 45 of triode section 41.

A portion of the sawtooth wave voltage obtained from the anode 47 of tube 43 is applied to the anode 3 of tube 1, as is required for phase comparison in tube 1 with the synchronizing signal applied to the cathode 7 of tube 1 in the manner illustrated in Figures 1 and 2.

The operation of tube 1 and its associated circuit elements in the circuit illustrated in Figure 3 is the same as that shown and described above for the circuit elements illustrated in Figure 1.

Having thus described the invention, what is claimed is:

1. A control circuit comprising in combination an electron discharge device having a cathode, an intermediate electrode and an anode, a local oscillator terminal to receive energy from a local oscillator to be controlled, a sync input terminal to receive a synchronizing signal, an output terminal to provide electrical control voltage, a connector between said anode and said local oscillator terminal, a connector between said cathode and said sync input terminal, a connection between said intermediate electrode and said output terminal, a resistance element having at least three terminals, said resistance element connected between said intermediate electrode and a terminal of fixed potential, and a connection between a terminal intermediate the ends of said resistance element and said cathode.

2. A control circuit comprising in combination an electron discharge device having a cathode, an anode and an electrode intermediate said cathode and said anode, a local oscillator terminal to receive energy from a local oscillator to be controlled, a sync input terminal to receive a synchronizing signal, a connection between said anode and one of said terminals, a connection between said cathode and the other of said terminals, an output terminal to provide electrical control voltage, a connection between said intermediate electrode and said output terminal, a resistance element connected between said intermediate electrode and a terminal of fixed potential, and a connection between a point intermediate the ends of said resistance element and said cathode.

3. A control circuit comprising in combination an electron discharge device having a cathode, a control electrode and an anode, a local oscillator terminal to receive energy from a local signal generator to be controlled, a sync input terminal to receive a synchronizing signal, an output terminal to provide electrical control voltage, a connection between said anode and said local oscillator terminal, a connection between said cathode and said sync input terminal, a connection between said control electrode and said output terminal, a resistance element connected between said cathode and said control electrode, and a second resistive element having a pair of terminals, one terminal connected to said cathode and means for maintaining the other terminal of said resistance at a fixed potential.

4. A control circuit comprising in combination an electron discharge device having a cathode, an anode and an electrode intermediate said cathode and said anode, a local oscillator coupled to said anode, a source of sync signals connected to said cathode, a connection between said intermediate electrode and said local oscillator to control the frequency thereof, a parallel connected resistance element and condenser connected between said intermediate electrode and a terminal of fixed potential, a connection between a point intermediate the ends of said resistance element and said cathode, and a resistance connected between said anode and a terminal of fixed potential 5. An oscillatory circuit, a variable reactance device connected in parallel with said oscillatory circuit and having a reactance control element, an electron discharge device having a cathode, an anode and an intermediate electrode between said cathode and said anode, a sync input terminal to receive a synchronizing signal, a connection between said cathode and said sync input terminal, a connection between said oscillatory circuit and said anode, a connection between said intermediate electrode and said reactance control element, a terminal of fixed potential, a resistance element connected between said intermediate electrode and said terminal, said cathode connected to a point of said resistance element intermediate the ends of said resistance element.

6. A control circuit comprising in combination, an electron discharge device having a cathode, an anode, and an intermediate electrode positioned between said cathode and said anode, a local oscillator terminal to receive energy from a local oscillator to be controlled, a sync input terminal to receive synchronizing pulses, an output terminal to provide frequency control energy, a connection between said anode and said local oscillator terminal, a connection between said cathode and said sync input terminal, a connection between said intermediate electrode and said output terminal, a parallel connected condenser and resistance element, a ground potential terminal, said parallel connected condenser and resistance element connected serially between said intermediate electrode and said ground potential terminal, said resistance element having a resistance terminal intermediate its ends and dividing the resistance of said resistance element, and a connection between said resistance element intermediate terminal and said cathode.

7. A control circuit comprising in combination, an electron discharge device having a cathode, an anode, and an intermediate electrode positioned between said cathode and said anode, a local oscillator terminal to receive energy from a local oscillator to be controlled, a sync input terminal to receive synchronizing pulses, an output terminal to provide frequency control energy, a connection between said anode and said local oscillator terminal through a capacitive element, a connection between said cathode and said sync input terminal, a connection between said intermediate electrode and said output terminal, a parallel connected condenser and resistance element, a ground potential terminal, said parallel connected condenser and resistance element connected serially between said intermediate electrode and said ground potential terminal, said resistance element having a resistance terminal intermediate its ends and dividing the resistance of said resistance element, and a connection between said resistance element intermediate terminal and said cathode.

8. A control circuit comprising in combination, an electron discharge device having a cathode, an anode, and an intermediate electrode positioned between said cathode and said anode, a local oscillator terminal to receive energy from a local oscillator to be controlled, a sync input terminal to receive a synchronizing signal, an output terminal to provide frequency control energy, a connection between said anode and said local oscillator terminal through a first capacitive element, a connection between said cathode and said sync input terminal through a second capacitive element, a connection between said intermediate electrode and said output terminal, a parallel connected condenser and resistance element, a ground potential terminal, said parallel connected condenser and resistance element connected serially between said intermediate electrode and said ground potential terminal, said resistance element having a resistance terminal intermediate its ends and dividing the resistance of said resistance element, and a connection between said resistance element intermediate terminal and said cathode.

9. An oscillatory circuit, a variable reactance device connected to said oscillatory circuit for frequency control, said variable reactance device having a reactance control element, an electron discharge device having a cathode, an anode, and a control electrode, a sync input terminal to receive synchronizing pulses, a connection between said cathode and said sync input terminal, an electrical coupling, said electrical coupling connected between said oscillatory circuit and said anode, a connection between said control electrode and said reactance control element, a terminal of substantially ground potential, a pair of resistance elements, one of said resistance elements connected between said control electrode and said cathode, the other of said resistance elements connected between said cathode and said terminal.

10. In a television system an electron beam deflection circuit comprising in combination, an oscillatory circuit, a variable reactance device connected to said oscillatory circuit for frequency control, said variable reactance device having a reactance control element, an electron discharge device having a cathode, an anode, and a control electrode, a sync input terminal to receive synchronizing pulses, a connection between said cathode and said sync input terminal, an electrical coupling, said electrical coupling connected between said oscillatory circuit and said anode, a connection between said control electrode and said reactance control element, a terminal of substantially ground potential, a pair of resistance elements, one of said resistance elements connected between said control electrode and said cathode, the other of said resistance elements connected between said cathode and said terminal.

11. In a signal generator of the type employing a thermionic tube having a control electrode and wherein the bias potential of said control electrode controls the frequency of recurrence of said signals, a control circuit comprising an electron discharge device having a cathode, an anode, and an intermediate electrode, a sync input terminal to receive synchronizing pulses, a connection between said cathode and said sync input terminal, an electrical coupling, said electrical coupling connected between said signal generator and said anode, a connection between said intermediate electrode and said control electrode, a terminal of substantially ground potential, a pair of resistance elements, one of said resistance elements connected between said intermediate electrode and said cathode, the other of said resistance elements connected between said cathode and said terminal.

ALLEN A. BARCO.

REFERENCES CITED

The following references are of record in the file of this patent:

UNITED STATES PATENTS

| Number | Name | Date |
|---|---|---|
| 1,846,043 | Terman | Feb. 23, 1932 |
| 1,861,232 | Gill | May 31, 1932 |